US007257993B2

(12) United States Patent
Geyer

(10) Patent No.: US 7,257,993 B2
(45) Date of Patent: Aug. 21, 2007

(54) METHOD OF OPERATING A SINGLE CYLINDER TWO-STROKE ENGINE

(75) Inventor: Werner Geyer, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 11/333,306

(22) Filed: Jan. 18, 2006

(65) Prior Publication Data

US 2006/0156800 A1 Jul. 20, 2006

(30) Foreign Application Priority Data

Jan. 18, 2005 (DE) ...................... 10 2005 002 275

(51) Int. Cl.
*G01M 15/00* (2006.01)

(52) U.S. Cl. ..................................................... 73/117.3

(58) Field of Classification Search .................. 73/116, 73/117.2, 117.3, 118.1, 119 A
See application file for complete search history.

(56) References Cited

U.S. PATENT DOCUMENTS 4,813,391 A * 3/1989 Geyer et al. .............. 123/73 C
5,343,844 A * 9/1994 Fukui et al. ................ 123/481
5,868,118 A * 2/1999 Yoshioka .................... 123/494
5,901,673 A 5/1999 Ishikawa
5,979,413 A * 11/1999 Ohnuma et al. ............ 123/491
6,769,394 B2 * 8/2004 Radel et al. ................ 123/325
2004/0045517 A1 * 3/2004 Fleig et al. .............. 123/73 PP
2005/0228575 A1 * 10/2005 Murakami et al. .......... 701/112

* cited by examiner

*Primary Examiner*—Eric S. McCall
(74) *Attorney, Agent, or Firm*—Walter Ottesen

(57) ABSTRACT

A method operates a single cylinder two-stroke engine having a cylinder wherein a combustion chamber is formed which is delimited by a piston. The piston drives a crankshaft rotatably journalled in a crankcase. In the method, fuel and combustion air are supplied to the two-stroke engine. In the combustion chamber, a mixture of fuel and combustion air is ignited and the exhaust gases flow out from the combustion chamber via an outlet. At idle, no fuel is metered over a crankshaft angle (α) of at least 700° in order to provide a smooth running of the two-stroke engine with low exhaust-gas values.

17 Claims, 4 Drawing Sheets

METHOD OF OPERATING A SINGLE CYLINDER TWO-STROKE ENGINE

CROSS REFERENCE TO RELATED APPLICATION

This application claims priority of German patent application no. 10 2005 002 275.8, filed Jan. 18, 2005, the entire content of which is incorporated herein by reference.

FIELD OF THE INVENTION

The invention relates to a method for operating a single cylinder two-stroke engine especially in a portable handheld work apparatus such as a portable chain saw, cutoff machine or the like.

BACKGROUND OF THE INVENTION

A two-stroke engine is disclosed in U.S. Pat. No. 5,901,673 wherein fuel is injected into the combustion chamber in the region of bottom dead center with each rotation of the crankshaft and the air/fuel mixture, which forms in the combustion chamber, is ignited in the region of top dead center of the piston.

Defective ignitions occur during idle of the two-stroke engine because of the flow conditions and the low pressure and the high residual gas components so that the mixture is not combusted in the combustion chamber. The uncombusted mixture flows out of the combustion chamber during the downward stroke of the piston. This leads to the situation that the exhaust-gas values of the two-stroke engine greatly increase. It has been shown that, during idle, no clean scavenging of the combustion chamber takes place so that, at idle, exhaust gases, substantially fuel-free air and fresh mixture hardly mix in the combustion chamber. This can lead to the situation that the ignition spark ignites at a spatial distance to the mixture because of the spatial arrangement of the exhaust gas and the fresh mixture so that no or only an incomplete combustion takes place. This operation occurs at an irregular sequence and leads to the typical idle performance of a two-stroke engine.

SUMMARY OF THE INVENTION

It is an object of the invention to provide a method for operating a single cylinder two-stroke engine of the kind described above so that the engine has a smooth operation at idle and low exhaust-gas values.

The method of the invention is for operating a single cylinder two-stroke engine. The two-stroke engine includes: a cylinder; a piston mounted in the cylinder to undergo a reciprocating movement along a stroke path between top dead center and bottom dead center during the operation of the engine; the cylinder and the piston conjointly delimiting a combustion chamber; a crankcase connected to the cylinder; a crankshaft rotatably mounted in the crankcase; the piston being connected to the crankshaft for imparting rotational movement to the crankshaft; and, the cylinder having an outlet through which exhaust gases can flow; the method including the steps of: supplying fuel and combustion air to the engine to form an air/fuel mixture in the combustion chamber; igniting the air/fuel mixture thereby generating exhaust gases which are discharged from the combustion chamber through the outlet; and, at idle, interrupting the supply of the fuel over a crankshaft angle ($\alpha$) of at least 700°.

With the above, the fuel metering at idle is so clocked that a metering of fuel and a subsequent combustion of the fuel in the combustion chamber takes place at most approximately each second revolution of the crankshaft. In those cycles in which no fuel is metered to the two-stroke engine, the combustion chamber is scavenged with a substantially fuel-free combustion air. In this way, the exhaust gas can be completely removed from the combustion chamber. In this way, it can be achieved that an ignitable mixture without old exhaust gas arises in the combustion chamber so that a renewed combustion of the mixture reliably takes place. It has been shown that a smoother running of the two-stroke engine can be achieved via the uniform ignition sequence even though a combustion of the mixture does not take place for each revolution of the crankshaft. Since the mixture is reliably combusted in the combustion chamber, no uncombusted fuel escapes via the outlet. In this way, the exhaust-gas values of the two-stroke engine are improved. It has been shown that a more uniform running noise of the two-stroke engine results because of the introduction of fuel which takes place at most approximately every two crankshaft revolutions. In this way, the operator perceives, also acoustically, a stable, uniform operation at idle.

Advantageously, fuel is metered during idle for each second to each sixth crankshaft revolution. Even when no fuel is metered over several crankshaft revolutions and therefore no combustion takes place, an adequate uniform drive of the crankshaft is achieved. A good scavenging of the combustion chamber is achieved especially when no fuel metering takes place over several sequential crankshaft revolutions so that in the next-following cycle, in which fuel is metered, a combustion can be ensured. The fuel, which is needed for the combustion, is made completely available in one cycle. For this reason, a fuel quantity is metered which is increased compared to the fuel metering for each preceding crankshaft revolution. In conventional two-stroke engines, wherein, for each crankshaft revolution, fuel is metered, the fuel from several cycles can reach the ambient uncombusted from the outlet because of defective ignitions and incomplete combustion.

In a two-stroke engine, which is operated in accordance with the method of the invention, the above is not possible because of the scavenging of the combustion chamber with substantially fuel-free combustion air. Advantageously, approximately 1.5 times up to 5 times the fuel quantity is supplied compared to the fuel metered for each preceding crankshaft revolution. Accordingly, the fuel quantity, which is injected in one cycle, is higher but overall a reduced fuel consumption results because, for example, for each second crankshaft revolution, 1.5 times the fuel quantity or for each third crankshaft revolution, twice the fuel quantity is metered. Advantageously, the time interval between two sequential meterings of fuel and the supplied fuel quantity vary. In this way, the idle rpm can be stabilized in a simple manner. The time interval between successive fuel meterings and the quantity of fuel metered in each case can take place in a controlled manner; however, a control, for example, in dependence upon the acceleration of the crankshaft, can also be provided.

Advantageously, fuel is supplied to the two-stroke engine at full load for each revolution of the crankshaft. At full load, a combustion of the mixture is obtained with each crankshaft revolution because of the following: the adjusting flow conditions; the high temperatures; and, the high pressure. Because of the adjusting pressure conditions, a good combustion chamber scavenging is achieved so that the exhaust gases are flushed, for the most part, out of the combustion chamber before new fuel is introduced into the combustion chamber.

The two-stroke engine has at least one transfer channel which connects the crankcase to the combustion chamber at pregiven positions of the piston. Advantageously, the combustion air is drawn into the crankcase during the movement of the piston toward the combustion chamber and flows through at least one transfer channel into the combustion chamber with the movement of the piston in the direction toward the crankcase. The combustion air is drawn by suction via at least one piston pocket and at least one transfer channel into the crankcase. In this way, the transfer channel can be completely scavenged with substantially fuel-free combustion air so that a good separation of the exhaust gases from the fuel or the mixture results.

At idle, the fuel is introduced via a valve which is controlled by a control. In this way, the time point of the introduction of fuel and the supplied fuel quantity can be controlled in a simple manner. Accordingly, it can be ensured that fuel is supplied to the two-stroke engine during full load operation with each crankshaft revolution and, at idle and possibly also at low rpms above at least 700° crankshaft angle, no fuel is supplied. Advantageously, the valve introduces the fuel into a transfer channel. At idle, the fuel is supplied while combustion air flows through the transfer channel into the combustion chamber. In this way, the supplied fuel is completely supplied to the combustion chamber. It has been shown that, at idle, a lubrication of the crankcase is unnecessary. Accordingly, a supply of fuel into the crankcase at idle is not needed for lubrication. The supply of fuel starts after a portion of the combustion air flows from the crankcase into the combustion chamber. The air, which has already flowed into the combustion chamber, establishes a separation of the fuel from exhaust gases from previous cycles which are possibly still in the combustion chamber.

In order to achieve an adequate lubrication of the crankcase at full load, fuel is supplied at full load while combustion air is drawn by suction into the crankcase. For an arrangement of the valve in the transfer channel, the fuel is transported into the crankcase by the air drawn by suction via the transfer channel. It can be practical that the fuel is supplied at least partially via a carburetor at full load. With the metering of fuel via a carburetor, the metering also takes place while combustion air is drawn by suction into the crankcase. At least a portion of the combustion air is drawn by suction together with the fuel via the carburetor.

In order to obtain a smooth running of the two-stroke engine at idle, monitoring is provided as to whether an acceleration of the crankshaft takes place after a metering of fuel. The acceleration of the crankshaft is an index as to whether an adequate combustion of fuel has taken place. The acceleration can be measured directly or indirectly. Fuel is again metered in the next revolution of the crankshaft when there is no acceleration thereof so that in the following cycle, a combustion and a corresponding acceleration of the crankshaft takes place. Advantageously, the time interval to the next metering of fuel is extended when the acceleration exceeds a pregiven value. In this way, a desired rpm of the engine can be adjusted in a simple manner.

An ignition of the mixture in the combustion chamber takes place only in the engine cycles wherein fuel is metered to the two-stroke engine. In the cycles wherein the combustion chamber is scavenged only with substantially fuel-free combustion air, the ignition can be suppressed. The ignition takes place especially via an ignition spark. The ignition energy is induced in the ignition coil by a magnet rotatably driven by the crankshaft and, at idle, the energy, which is induced via several crankshaft revolutions, can be intermediately stored. In handheld work apparatus, making the needed ignition energy available at low rpm presents a difficulty because such work apparatus do not usually have a battery which could make additional energy available. Because the energy is intermediately stored via several crankshaft revolutions, it can be ensured that an adequately large quantity of energy is available for the ignition spark. In order to ensure that the mixture, which is present in the combustion chamber, is reliably ignited, it can be furthermore provided that the ignition spark is maintained at idle over a time interval extended relative to the ignition at each crankshaft revolution. This is made possible by the intermediate storage of the energy over several crankshaft revolutions.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
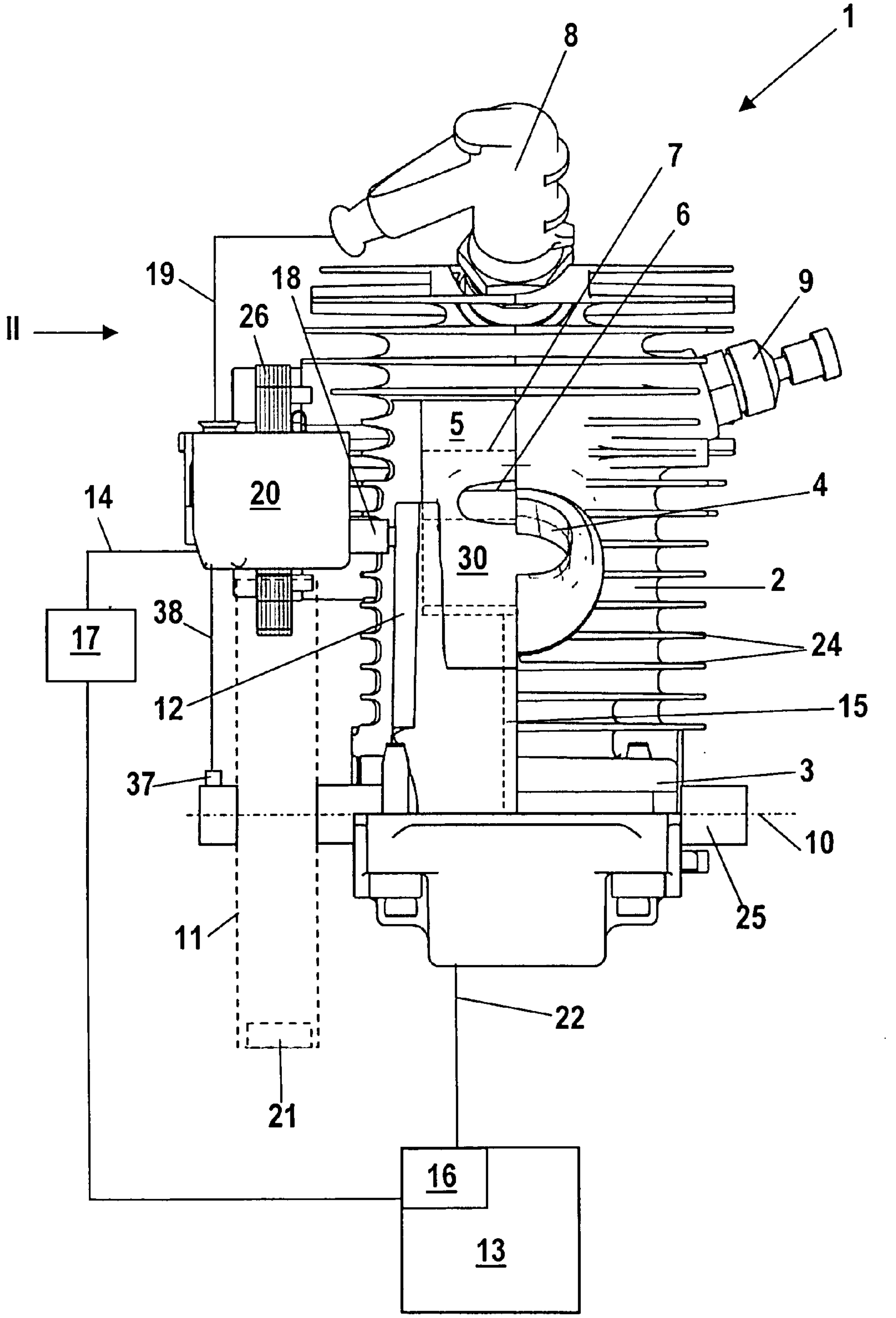
FIG. 1 is a schematic side elevation view of a two-stroke engine which draws in substantially fuel-free air via a piston pocket.

The two-stroke engine 1 shown in FIG. 1 has a cylinder 2 having cooling ribs 24 arranged on the outer surface thereof. A piston 7 is reciprocally journalled in the cylinder 2 and is shown in phantom outline. The piston 7 drives a crankshaft 25 via a connecting rod 15. The crankshaft 25 is rotatably journalled in a crankcase 3 about the crankshaft axis 10. An inlet 4 opens on the cylinder 2 via which substantially fuel-free combustion air is supplied to the two-stroke engine which is configured as a single cylinder engine.

The two-stroke engine includes at least one transfer channel 12 which connects the crankcase 3 to a combustion chamber 5 in the region of bottom dead center of the piston 7. The combustion chamber 5 is delimited by the cylinder 2 and the piston 7. Two or four transfer channels 12 are provided and are arranged symmetrically with respect to a partitioning center plane centered with respect to the inlet 4. The piston 7 has a piston pocket 30 indicated in phantom outline in FIG. 1. Two piston pockets 30 can also be provided arranged on both sides of the inlet 4. The piston pocket 30 connects the inlet 4 to the transfer channel 12 in the region of top dead center of the piston 7 so that the combustion air can flow via the inlet 4 and the piston pocket 30 into the transfer channel 12 and from there into the crankcase 3. In this way, the transfer channel 12 is completely scavenged with substantially fuel-free combustion air. A decompression valve 9 can be mounted in the cylinder 2 via which the combustion chamber 5 can be vented to facilitate starting of the two-stroke engine. A spark plug 8 is mounted on the cylinder 2 and projects into the combustion chamber 5. An outlet 6 leads out from the cylinder 2 through which the exhaust gases can flow out of the combustion chamber 5.

A valve 18 is provided for metering fuel and is especially configured as an electromagnetic valve. The valve 18 can, however, also be integrated on an injection nozzle. The valve 18 is integrated in an ignition module 20. The valve 18 is controlled by a control unit, for example, a central control unit (CPU) which is mounted in the ignition module 20. The ignition module 20 controls the ignition of the spark plug 8 via a lead 19. A magnet 21 is mounted on the crankshaft 25 for generating the ignition energy. More specifically, the magnet 21 is mounted on a fan wheel 11 which, in turn, is mounted on the crankshaft so as to rotate therewith.

Figure 2:
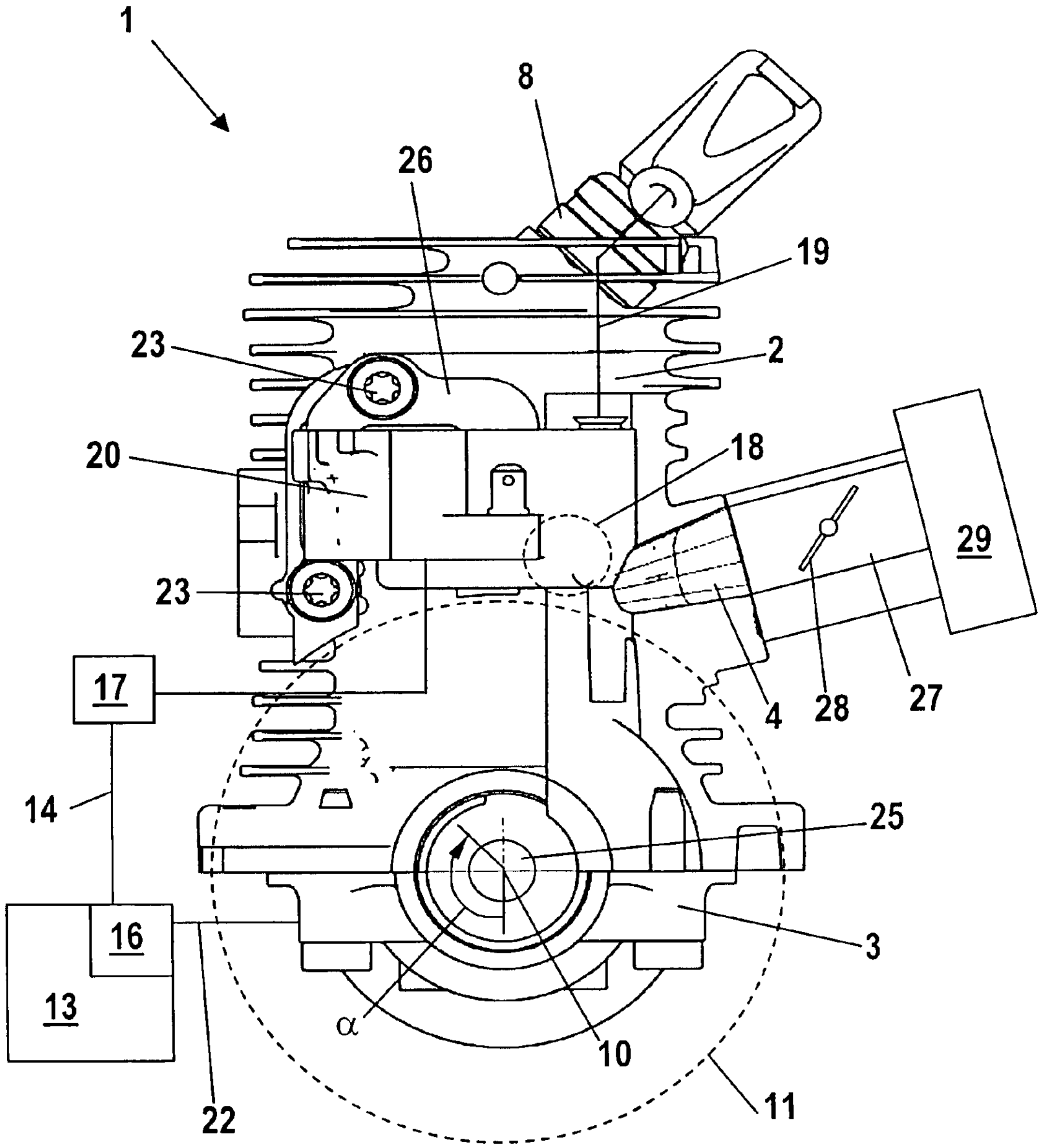
FIG. 2 is a side elevation view of the two-stroke engine of FIG. 1 viewed in the direction of arrow II of FIG. 1.

As shown in FIG. 2, a sheet metal packet 26 with an ignition coil (not shown) is mounted on the ignition module 20 at the periphery of the fan wheel 11. The magnet 21 induces a voltage in the ignition coil which generates the ignition spark in the spark plug 8. The ignition module 20 is attached to the cylinder 2 via threaded fasteners 23.

The electromagnetic valve 18 is integrated on the ignition module 20 and is connected via a fuel line 14 to the fuel pump 16 mounted in the fuel tank 13. The fuel pump 16 can be configured as a membrane pump and is driven by the fluctuating crankcase pressure. For this purpose, the fuel pump 16 is connected via a pulse line 22 to the crankcase 3. The fuel pump 16 pumps the fuel from the fuel tank 13 into a fuel store 17 from where it arrives at the electromagnetic valve 18. A pressure control valve can be mounted in the fuel store 17 and this valve can be connected via a return line to the fuel tank.

As shown in FIG. 2, the combustion air, which is supplied to the two-stroke engine 1 via the inlet 4, is drawn by suction via a filter 29 as well as an air channel 27. In the air channel 27, a throttle flap 28 is mounted for controlling the supplied air quantity.

During operation of the engine 1, at full load, substantially fuel-free combustion air is drawn by suction in the region of top dead center of the piston 7 from the inlet 4 via the piston window 30 and the transfer channel 12 into the crankcase 3. To lubricate the crankcase 3, the valve 18 conducts a fuel/oil mixture (which is typical for a two-stroke engine) to the combustion air at the start of the induction phase. The fuel/oil mixture is conveyed by the combustion air into the crankcase 3 and the transfer channel 12 is thereafter substantially completely filled with fuel-free air. The fuel/oil mixture and the combustion air are compressed with the downward stroke of the piston 7 in the crankcase 3. As soon as the piston 7 opens the transfer channel 12 toward the combustion chamber 5, first fuel-free air and thereafter fuel/oil/air mixture flows from the crankcase 3 into the combustion chamber 5.

In the subsequent upward stroke of the piston 7, the mixture is compressed in the combustion chamber 5 and, controlled by the control unit integrated in the ignition module 20, is ignited by the spark plug 8. The ignited mixture expands with the combustion so that the piston 7 is pressed in the direction toward the crankcase 3. The exhaust gases flow through the outlet 6 from the combustion chamber 5 and are scavenged or expelled by the substantially fuel-free air after flowing through the transfer channel 12. At full load, fuel is supplied to the two-stroke engine 1 with each revolution of the crankshaft 25. The valve 18 opens after every crankshaft angle $\alpha$ (FIG. 2) of approximately 360°.

At idle of the two-stroke engine 1, combustion air is drawn by suction out of the inlet 4 via the piston pocket 30 and the transfer channel 12 into the crankcase, 3 in the region of top dead center of the piston 7. In this phase, no injection of fuel takes place. The combustion air is compressed in the crankcase 3 during the downward stroke of the piston 7 and flows via the transfer channel 12 into the combustion chamber 5 as soon as the transfer channel 12 opens to the combustion chamber 5. After a portion of the combustion air has passed into the combustion chamber 5, fuel is injected via the electromagnetic valve 18 into the combustion air flowing through the transfer channel 12. The fuel passes into the combustion chamber 5. There, the fuel is compressed during the upward stroke of the piston 7 and is ignited by the spark plug 8. Thereafter, the combustion mixture expands in the combustion chamber 5 and presses the piston 7 toward the crankcase 3. The exhaust gases flow out through the outlet 6. In the region of top dead center of the piston 7, combustion air for the next cycle is drawn by suction through the inlet 4. With the downward movement of the piston 7, the combustion air passes from the crankcase 3 via the transfer channel 12 into the combustion chamber 5. In this cycle, however, no fuel is added to the combustion air so that the combustion chamber is scavenged with substantially fuel-free air. Also, it is not necessary that an ignition take place via the spark plug 8. The air leaves the combustion chamber 5 through the outlet 6. At idle, only approximately every second to every sixth crankshaft revolution, fuel is supplied and, in the cycles lying therebetween, the combustion chamber 5 is scavenged with air. The ignition can be suppressed during this scavenging phase or can remain switched on.

In idle, the fuel is injected into the transfer channel 12 during the flowing of combustion air from the crankcase 3 into the combustion chamber 5. A metering of fuel to the crankcase 3 for lubrication of the crankshaft 25 is not necessary. No fuel is metered to the two-stroke engine 1 over a crankshaft angle $\alpha$ of at least 700°. The metering of fuel takes place in a clocked manner. The fuel quantity, which is metered approximately each second to each sixth crankshaft revolution, is, however, increased relative to fuel metering taking place for each crankshaft revolution. Advantageously, approximately 1.5 times to 5 times the fuel quantity is metered.

In order to ensure that a combustion takes place each second to each sixth crankshaft revolution, monitoring is conducted as to whether an acceleration of the crankshaft 25 takes place in order to determine whether the mixture in the combustion chamber was ignited and combusted. For this purpose, the time-dependent distance between the ignition pulses triggered by the rotating magnet 21 is determined by the central control unit (CPU). For this purpose, for example, the rotational speed of the crankshaft 25 can be measured. For measuring the rotational speed of the crankshaft, the sensor 37 shown in FIG. 1 is provided and this sensor is connected via the lead 38 to the control unit integrated into the ignition module 20. When no combustion of the mixture or acceleration of the crankshaft takes place, fuel is supplied anew with the following revolution of the crankshaft. This takes place via the control unit integrated into the ignition module 20. If the acceleration exceeds a pregiven value (which, for example, can depend upon the desired rpm), then the time-dependent distance to the next fuel metering is controlled by the CPU to be extended. In this way, the rpm, especially the idle rpm, can be stabilized. To stabilize the idle rpm, the metered fuel quantity per cycle can furthermore be varied. A simple stabilization of the rpm (especially the idle rpm) is possible via the variation of the time-dependent distance between two successive fuel meterings and the respectively metered fuel quantities.

Figure 4:
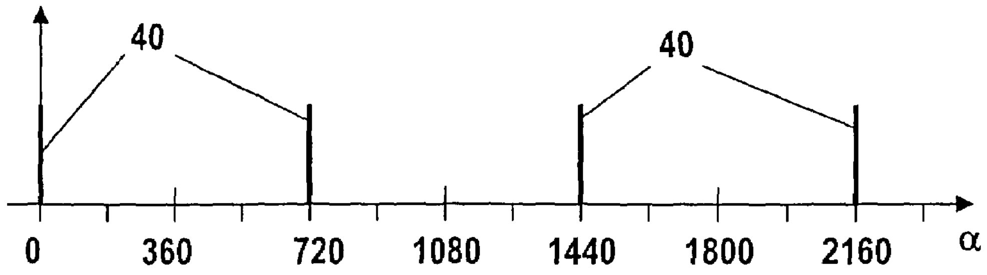
Figure 5:
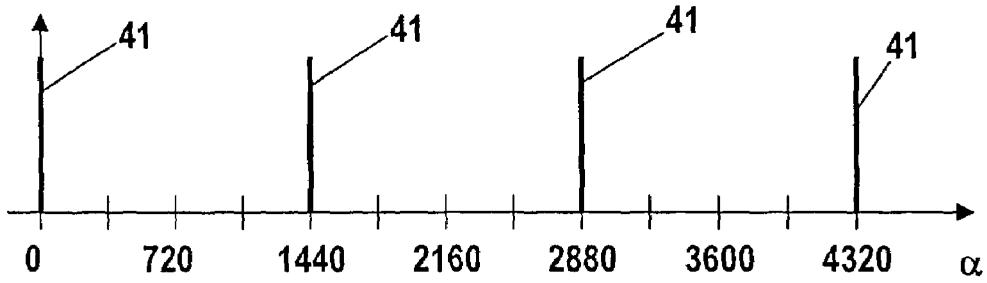
Figure 6:
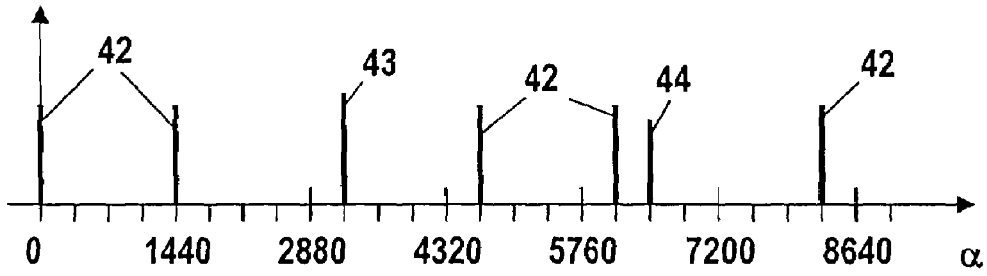

In FIGS. 4 to 6, the metering of fuel is plotted as a function of the crankshaft angle $\alpha$. For the clocking of the metering of fuel shown in FIG. 4, the metering of fuel takes place in a clocked manner every two revolutions of the crankshaft. Accordingly, the start of the fuel injection takes place after each 720° crankshaft angle α. The injection of fuel is indicated in FIG. 4 by the bars 40. A metering of fuel takes place every two revolutions of the crankshaft and the metered fuel quantity is constant each time.

FIG. 5 shows a diagram of the fuel metering wherein the fuel metering takes place every four revolutions of the crankshaft 25. The fuel metering is indicated by the bars 41. Accordingly, the fuel metering in a cycle takes place at a distance of 1440° crankshaft angle α from the start of the previous fuel metering.

For the clocking shown schematically in FIG. 6, the metering of fuel (that is, for example, the fuel injection) takes place every four crankshaft revolutions, that is, after 1440° crankshaft angle α. This is indicated by the bars 42. A stochastic lengthening or shortening of the interval is superposed on this constant clocking for the stabilization of the idle rpm by the CPU between two successive fuel meterings. Thus, the fuel metering, which is indicated by the bars 43, does not take place already after a crankshaft angle a of 2880° but only after 3240°, that is, one revolution of the crankshaft 25 later. To reduce the instantaneous rpm after an ignition misfire, the metering of fuel, which is indicated by the bar 44, does not take place at a distance of 1440° crankshaft angle α to the previous fuel metering, that is, not at 7560° crankshaft angle α but already three revolutions of the crankshaft earlier, namely, at a crankshaft angle α of 6480°. In this way, a short term rpm increase is obtained. Only one rotation of the crankshaft 25 lies between the fuel metering, which is indicated by the bar 44, and the previous metering of fuel.

As shown additionally in FIG. 6, the metered fuel quantity can be correspondingly adapted in the cycles also by a shortened or lengthened clocking. In a short clocking, less fuel is accordingly supplied and for an extended clocking, more fuel is supplied. It can, however, also be advantageous to meter the same quantity of fuel in each clocked cycle.

An ignition of the mixture takes place only in the engine cycles wherein the electromagnetic valve 18 has supplied fuel. For this purpose, the ignition module 20 can have a unit for storage, for example, a capacitor wherein the energy is stored which is induced into the ignition coil over several revolutions of the crankshaft 25. The ignition spark, which is generated by the spark plug 8, can thereby be maintained over a longer time duration. In this way, it is ensured that for a desired ignition by the spark plug 8, the mixture, which is in the combustion chamber 5, actually combusts.

Figure 3:
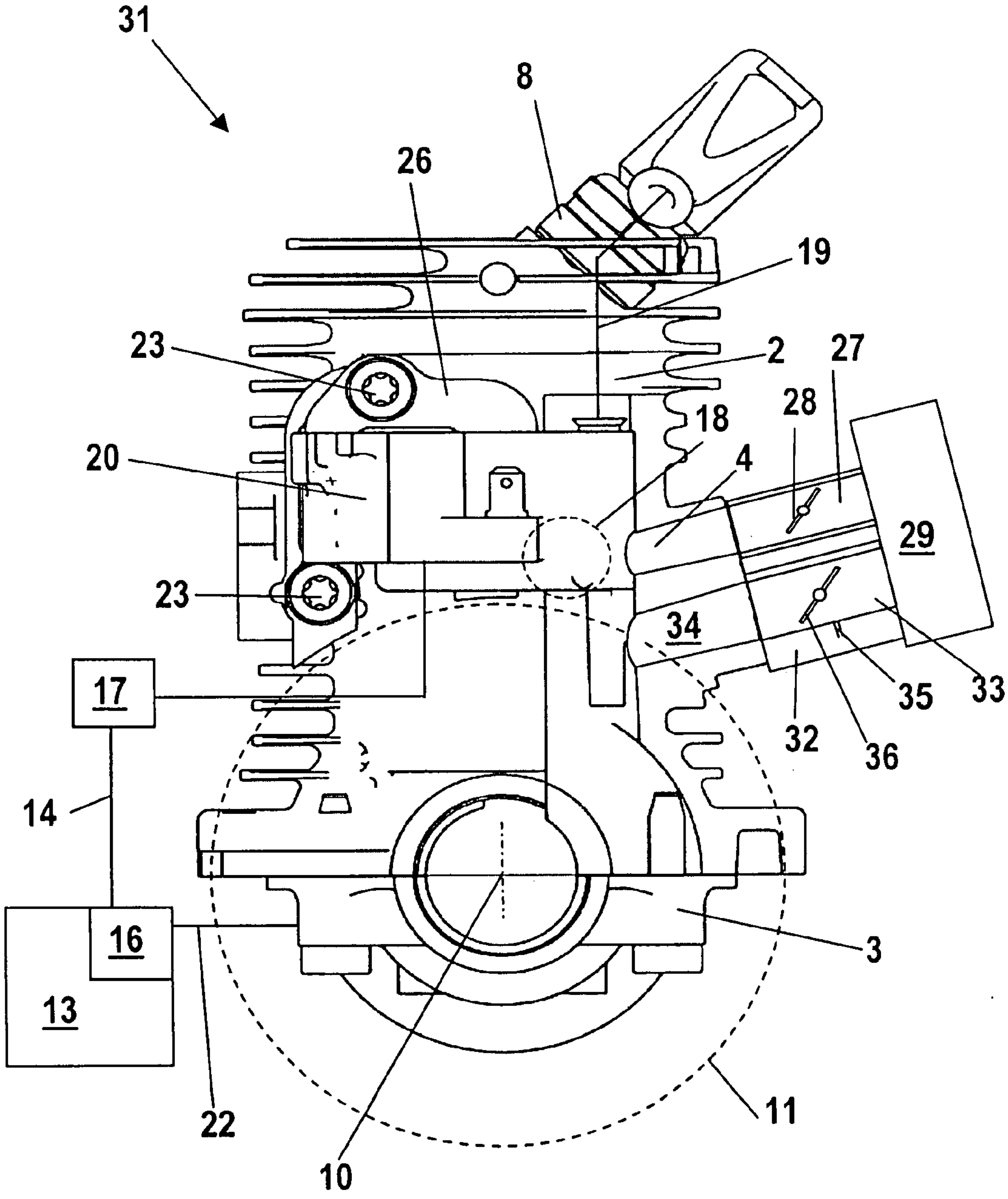
FIG. 3 is a schematic of a two-stroke engine having a scavenging-advance function; and, FIGS. 4 to 6 are diagrams showing the metering of fuel as a function of crankshaft angle.

In FIG. 3, an embodiment of a single cylinder two-stroke engine 31 is shown. The same reference numerals identify the same components as in FIGS. 1 and 2. The two-stroke engine 31 has an inlet 4 for substantially fuel-free air as well as a mixture inlet 34. A carburetor 32 shown schematically in FIG. 3 is arranged at the mixture inlet 34. A throttle unit is mounted in the carburetor 32 and is here shown as a pivotally journalled throttle flap 36. In the region of the throttle flap 36, a fuel opening 35 opens into the mixture channel 33 configured in the carburetor 32. The fuel opening 35 meters fuel to the mixture channel 33. During full load operation of the two-stroke engine 31, at least a portion of the fuel is supplied via the carburetor 32. During idle operation, the metering of fuel takes place via the valve 18 integrated on the ignition module 20. In this way, a lubrication of the crankcase 3 is achieved in a simple manner during full load operation. At the same time, a sufficient fuel supply is ensured.

The fuel metering can also take place via a valve, which is arranged on the crankcase, or another unit for metering fuel.

It is understood that the foregoing description is that of the preferred embodiments of the invention and that various changes and modifications may be made thereto without departing from the spirit and scope of the invention as defined in the appended claims.

What is claimed is:

1. A method of operating a single cylinder two-stroke engine, the two-stroke engine including: a cylinder; a piston mounted in said cylinder to undergo a reciprocating movement along a stroke path between top dead center and bottom dead center during the operation of said engine; said cylinder and said piston conjointly delimiting a combustion chamber; a crankcase connected to said cylinder; a crankshaft rotatably mounted in said crankcase; said piston being connected to said crankshaft for imparting rotational movement to said crankshaft; and, said cylinder having an outlet through which exhaust gases can flow; the method comprising the steps of:

metering fuel and supplying combustion air to said engine to form an air/fuel mixture in said combustion chamber;

igniting said air/fuel mixture thereby generating exhaust gases which are discharged from said combustion chamber through said outlet;

at idle, interrupting the supply of said fuel over a crankshaft angle (α) of at least 700°;

at idle, metering fuel to said engine every second to every sixth crankshaft revolution; and, varying the time interval between successive meterings of fuel and varying the quantity of fuel metered.

2. The method of claim 1, comprising the further step of incrementally increasing the quantity of fuel metered to said engine after each revolution of said crankshaft compared to the fuel metered for the preceding revolution of said crankshaft.

3. The method of claim 2, wherein the incremental increases of the fuel quantity are 1.5 to 5 times greater for each revolution of said crankshaft compared to the preceding revolution thereof.

4. The method of claim 1, comprising the further step of metering fuel to said engine at full load for each revolution of said crankshaft.

5. The method of claim 1, wherein said engine further includes at least one transfer channel for connecting said crankcase to said combustion chamber at pregiven positions of said piston; and, the method comprises the further step of drawing in combustion air into said crankcase during the movement of said piston toward said combustion chamber and, when said piston moves in the direction toward said crankcase, combustion air flows into said combustion chamber.

6. The method of claim 5, wherein said piston has a piston pocket; and, said method comprises the further step of drawing in combustion air via said piston pocket and said transfer channel.

7. The method of claim 1, said engine including a valve and a control unit for controlling said valve; and, said method comprising the further step of metering said fuel via said valve into said transfer channel during idle.

8. The method of claim 5, comprising the further step of metering said fuel at idle while combustion air flows through said transfer channel into said combustion chamber.

9. The method of claim 8, comprising the further step of starting the metering of said fuel after a portion of said combustion air has flowed out of said crankcase into said combustion chamber.

10. The method of claim 1, comprising the further step of metering said fuel at full load while combustion air is drawn into said crankcase.

11. The method of claim 10, said engine including a carburetor and said method comprising the further step of metering said fuel at least partially via said carburetor at full load.

12. A method of operating a single cylinder two-stroke engine, the two-stroke engine including: a cylinder; a piston mounted in said cylinder to undergo a reciprocating movement along a stroke path between top dead center and bottom dead center during the operation of said engine; said cylinder and said piston conjointly delimiting a combustion chamber; a crankcase connected to said cylinder; a crankshaft rotatably mounted in said crankcase; said piston being connected to said crankshaft for imparting rotational movement to said crankshaft; and, said cylinder having an outlet through which exhaust gases can flow; the method comprising the steps of:

metering fuel and supplying combustion air to said engine to form an air/fuel mixture in said combustion chamber;

igniting said air/fuel mixture thereby generating exhaust gases which are discharged from said combustion chamber through said outlet;

at idle, interrupting the supply of said fuel over a crankshaft angle ($\alpha$) of at least 700°;

monitoring said engine to determine whether an acceleration of said crankshaft takes place after a metering of said fuel; and, when there is no acceleration of said crankshaft, metering fuel anew with the next revolution of said crankshaft.

13. The method of claim 12, the method comprising the further step of increasing the time interval to the next metering of fuel when said acceleration exceeds a predetermined value.

14. The method of claim 1, wherein an ignition of said mixture takes place only in those engine cycles wherein fuel is metered to said engine.

15. The method of claim 14, wherein the ignition of said air/fuel mixture takes place via an ignition spark; and, said engine further includes an ignition coil and a magnet rotatably driven by said crankshaft to induce a voltage in said ignition coil to generate the ignition energy for said ignition spark; and, the method comprises the further step of intermediately storing the induced energy over several crankshaft revolutions.

16. The method of claim 15, wherein, at idle, said ignition spark is maintained over a time interval which is increased compared to the ignition for each crankshaft revolution.

17. A method of operating a single cylinder two-stroke engine, the two-stroke engine including: a cylinder; a piston mounted in said cylinder to undergo a reciprocating movement along a stroke path between top dead center and bottom dead center during the operation of said engine; said cylinder and said piston conjointly delimiting a combustion chamber; a crankcase connected to said cylinder; a crankshaft rotatably mounted in said crankcase; said piston being connected to said crankshaft for imparting rotational movement to said crankshaft; said cylinder having an outlet through which exhaust gases can flow; at least one transfer channel for connecting said crankcase to said combustion chamber at pregiven positions of said piston; a carburetor; and, a valve and a control unit for controlling said valve; the method comprising the steps of:

metering fuel and supplying combustion air to said engine to form an air/fuel mixture in said combustion chamber;

igniting said air/fuel mixture thereby generating exhaust gases which are discharged from said combustion chamber through said outlet;

at idle, interrupting the supply of said fuel over a crankshaft angle ($\alpha$) of at least 700°;

metering said fuel via said valve into said transfer channel during idle;

metering said fuel at full load while combustion air is drawn into said crankcase; and, metering at least a portion of said fuel via said carburetor at full load into said crankcase.

* * * * *